United States Patent [19]

Okano et al.

[11] Patent Number: 5,468,836
[45] Date of Patent: Nov. 21, 1995

[54] PROCESS FOR THE PREPARATION OF POLYCARBONATE

[75] Inventors: Yoshimichi Okano; Tatsuya Kanno; Tsutomu Yamato; Yasuhiro Oshino; Michiyo Tanigawa; Takaaki Kuwana; Yutaka Fukuda, all of Hyogo, Japan

[73] Assignee: Daicel Chemical Industries, Ltd., Osaka, Japan

[21] Appl. No.: 119,065

[22] PCT Filed: Jan. 28, 1993

[86] PCT No.: PCT/JP93/00104

§ 371 Date: Sep. 13, 1993

§ 102(e) Date: Sep. 13, 1993

[87] PCT Pub. No.: WO93/15129

PCT Pub. Date: Aug. 5, 1993

[30] Foreign Application Priority Data

Jan. 29, 1992 [JP] Japan .................... 4-013643
Jan. 29, 1992 [JP] Japan .................... 4-013644
Jan. 29, 1992 [JP] Japan .................... 4-013645
Jan. 29, 1992 [JP] Japan .................... 4-013646
Jan. 29, 1992 [JP] Japan .................... 4-013647

[51] Int. Cl.$^6$ .................................. C08G 64/00
[52] U.S. Cl. .................. 528/204; 528/196; 528/198; 528/199

[58] Field of Search .................... 528/204, 198, 528/196, 199

[56] References Cited

U.S. PATENT DOCUMENTS 5,025,083  6/1991  Ueda et al. .................. 528/198
5,149,770  9/1992  Kanno et al. ................. 528/199

Primary Examiner—James J. Seidleck
Assistant Examiner—Terressa Mosley
Attorney, Agent, or Firm—Flynn, Thiel, Boutell & Tanis

[57] ABSTRACT

A polycarbonate which is not discolored and is substantially free from chlorine ions causative of discoloration, has a branching parameter G of 0.1 to 1.0 and, terminal hydroxyl groups of 20 mole % or below based on all the terminal groups of the polycarbonate, and/or, a chlorine ion concentration in the polycarbonate of 10 ppm or below, and/or, a total of an alkali metal ion concentration and an alkaline earth metal ion concentration in the polycarbonate of 1 ppm or below. A process for preparing the above polycarbonate by the melt transesterification process which comprises using a nitrogenous basic compound (a), and/or, a compound (b) containing an element selected from the group consisting of Groups IIb, IVb and Vb of the periodic table; or, a nitrogenous basic compound (a), and, a compound (c) containing an element selected from the group consisting of alkali metals and alkaline earth metals, as a transesterification catalyst.

3 Claims, No Drawings

PROCESS FOR THE PREPARATION OF POLYCARBONATE

This is a continuation of PCT/JP93/00104 filed Jan. 23, 1993.

FIELD OF THE INVENTION

The present invention relates to a polycarbonate and a process for the preparation thereof. More particularly, the present invention relates to a linear polycarbonate which is not discolored and is free from any branched structure which might be formed by a side reaction during polymerization and a process for the preparation thereof, and a novel branched polycarbonate which does not contain chlorine ions causative of discoloration and is suitable for the production of a hollow molding and an efficient process for the preparation thereof.

DESCRIPTION OF THE RELATED ART

A polycarbonate is prepared by the interfacial polycondensation process (i.e., the phosgene process) which comprises adding a solvent such as methylene chloride to an aqueous solution or suspension of a sodium salt of a dihydric phenol and blowing phosgene into the obtained system to conduct a reaction, or by the transesterification process which comprises heat-melting a dihydric phenol and a carbonic acid diester such as diphenyl carbonate and conducting the polycondensation thereof through transesterification at a high temperature and under a reduced pressure.

Between the above processes, the interfacial polycondensation process is generally widely utilized. However, according to this process, not only the use of highly toxic phosgene is necessitated, but also chlorine ions remain in a polycarbonate produced. When chlorine ions remain in a polycarbonate, the polymer discolors during molding thereof at high temperature. Accordingly, the polymer obtained must be washed to lower the residual chlorine ion concentration.

On the other hand, the transesterification process has advantages that the use of highly toxic phosgene is not necessitated and that the provision of a step of removing residual chlorine ions is unnecessary. The transesterification process generally necessitates a catalyst and various compounds have already been proposed to be useful in the preparation of a polycarbonate. However, the formation of a high-molecular-weight polycarbonate by the transesterification process is generally difficult, unlike the interfacial polycondensation process and the polymer is discolored because the reaction is conducted in the presence of a catalyst at a high temperature and under a reduced pressure.

A process for the preparation of a polycarbonate using a catalyst comprising a combination of a nitrogenous basic compound with a boron compound is proposed, for example, in U.S. Pat. No. 4,590,257 (date of patent: May 20, 1986, assignee: General Electric), and a relatively light-colored polycarbonate can be obtained with the use of this catalyst. However, it has a problem that this catalyst has too low an activity to give a high-molecular-weight polycarbonate.

Alkali metal compounds or alkaline earth metal compounds are well known as high-activity catalysts effective in the preparation of a polycarbonate by the transesterification process. However, these compounds are known to cause side reactions leading to a branched structure through the Kolbe-Schmitt reaction or the formation of an isoalkenylphenol [see L. Bottenbruch, Encyclopedia of Polymer Science and Technology, 10, 722 (1969)]. Accordingly, when the transesterification process is conducted by the use of the above catalyst for the purpose of preparing a high-molecular-weight polycarbonate, a branched structure is formed by the side reaction, so that the product obtained under certain reaction conditions is partially insoluble in a solvent such as methylene chloride or is significantly discolored.

Accordingly, an object of the present invention is to provide a high-molecular-weight linear polycarbonate which is not discolored, is free from chlorine ions causative of discoloration and, further, is free from any branched structure which might be formed by a side reaction, and a process for the preparation thereof.

Meanwhile, since polycarbonates of the prior art exhibited Newtonian fluid characteristics in a molten state, the molding thereof into a hollow article was difficult. It has been known that the melt viscosity of a polycarbonate under a high shear rate decreases and that under a low shear rate increases by imparting a branched structure to the polycarbonate [see D. FREITAG et al., Encyclopedia of Polymer Science and Engineering, 11, 660 (1988)]. Therefore, the moldability of a polycarbonate into a hollow article can be improved by utilizing this fact. Thus it is a practice to impart a branched structure to a polycarbonate by utilizing a polyfunctional organic compound having at least three functional groups as a branching agent in the preparation of a polycarbonate.

For example, in Japanese Patent Publication-A Nos. 163131/1991 and 163132/1991 (both, Publication Date: Jul. 15, 1991, Applicant: Idemitsu Petrochemical Co., Ltd.) and U.S. Pat. No. 5,104,964 corresponding to the former, a branched polycarbonate is prepared by utilizing a polyfunctional organic compound having at least three functional groups as a branching agent in the preparation of a polycarbonate by the interfacial polycondensation process (i.e., the phosgene process), which comprises adding a solvent such as methylene chloride to an aqueous solution or a suspension of a sodium salt of a dihydric phenol and blowing phosgene thereinto. Although the branched polycarbonate thus prepared is improved in moldability, not only does this process necessitate the use of highly toxic phosgene, but also chlorine ions remain in the polycarbonate produced by this process. When chlorine ions remain in a polycarbonate, the polymer discolors in the molding thereof at high temperature. Accordingly, a step of washing the polymer obtained is necessitated to lower the residual chlorine ion concentration.

As described above, there is known the melt transesterification process besides the interfacial polycondensation process as a process for preparing a polycarbonate, which process comprises heat-melting a dihydric phenol and a carbonic acid diester such as diphenyl carbonate and conducting the polycondensation through transesterification at a high temperature and under a reduced pressure. The transesterification process has advantages that the use of highly toxic phosgene is not necessitated and that it can dispense with the step of removing residual chlorine ions, thus being a remarkably effective process for preparing a polycarbonate free from chlorine ions causative of discoloration.

When a process using an alkali metal compound or an alkaline earth metal compound as a catalyst, among the transesterification processes for the preparation of a polycarbonate, is conducted, branched structures by the Kolbe-Schmitt reaction and/or through the formation of an isoalkenylphenol are formed [see L. Bottenbruch, Encyclopedia of Polymer Science and Technology, 10, 722 (1969)] as described above. However, the formation of branched structures by such side reactions are very difficult to control and the obtained polycarbonates exhibit extremely poor physical properties, because a structure different from that inherent to a polycarbonate is incorporated into the polymer by the formation of a branched structure. Further, the formation of branched structures by the above side reactions are closely connected with the discoloration of a polycarbonate.

Accordingly, an object of the present invention is to provide a polycarbonate useful for the production of a hollow molding, which is not discolored, is free from chlorine ions causative of discoloration, and, further, has a branched structure formed not by a side reaction but by using a polyfunctional organic compound having at least three functional groups as a branching agent, and a process for the preparation thereof.

DISCLOSURE OF THE INVENTION

The present inventors have extensively studied to attain the above objects and, as a result, they have found that the side reaction occurring in the preparation of a polycarbonate by the transesterification process can be remarkably depressed by conducting the transesterification in the presence of a specific catalyst to be able to give a linear high-molecular-weight polycarbonate which is not discolored and is substantially free from chlorine ions causative of discoloration and from any branched structure, and that a polycarbonate suitable for the purpose can be prepared by conducting the reaction in the presence of a specific additional compound. Thus, they have accomplished the present invention.

Further, the present inventors have extensively studied to attain the above objects and, as a result, have found that when a polycarbonate is prepared by the transesterification process in the presence of a branching agent and a specific catalyst, a branched polycarbonate which is scarcely discolored, is substantially free from chlorine ions causative of discoloration, and is suitable for the production of a hollow molding can be prepared substantially without causing any side reaction leading to a branched structure, and that a branched polycarbonate suitable for the purpose can be prepared by conducting the reaction in the presence of a specific additional compound. Thus, they has accomplished the present invention.

Accordingly, the present invention provides a polycarbonate having a branching parameter $G=[\eta]/[\eta]_{lin}$ (wherein $[\eta]$ is the limiting viscosity number of a test polycarbonate in methylene chloride at 20° C. and $[\eta]_{lin}$ is the limiting viscosity number of a linear polycarbonate having a weight-average molecular weight, which is determined by the light scattering method, equal to that of the test polycarbonate in methylene chloride at 20° C.) of exceeding 0.90 and up to 1.0.

Also, the present invention provides a polycarbonate having a branching parameter G of 0.1 to 1.0 and satisfying at least one of the following requirements (A) to (C):

(A) the terminal hydroxyl groups are present in an amount of 20 mole % or below based on all the terminal groups of the polycarbonate, (B) the chlorine ion concentration in the polycarbonate is 10 ppm or below, and (C) the total of the alkali metal ion concentration and the alkaline earth metal ion concentration in the polycarbonate is 1 ppm or below.

The linear polycarbonate desirable is one having a branching parameter G of 0.8 to 1.0, preferably 0.88 to 1.0 and still preferably exceeding 0.9 and up to 1.0.

The branched polycarbonate desirable is one having a branching parameter G of 0.1 to 0.9, preferably 0.1 or above but below 0.88, and still preferably 0.1 or above but below 0.8.

Furthermore, the present invention provides processes for the preparation of a polycarbonate from a dihydric phenol and a carbonic acid diester in the presence of a transesterification catalyst by the melt transesterification process which comprise process (1) for the preparation of the above polycarbonate of the present invention wherein (a) a nitrogenous basic compound and/or (b) a compound containing an element selected from the group consisting of Groups IIb, IVb and Vb of the periodic table are used as the transesterification catalyst(s), and a process (2) for the preparation of the above polycarbonate of the present invention wherein (a) a nitrogenous basic compound and (c) a compound containing an element selected from the group consisting of alkali metals and alkaline earth metals are used as the transesterification catalysts.

In carrying out the process (2), it is preferable to conduct the reaction in the presence of a compound represented by the following general formulas (I) or (II):

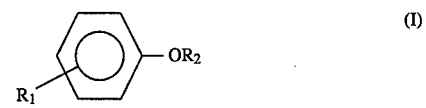

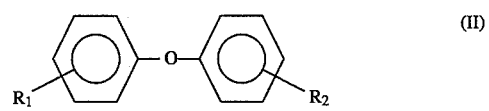

wherein $R_1$ and $R_2$ are each a hydrogen atom or a linear or branched alkyl group having 1 to 8 carbon atoms.

The present invention provides a polycarbonate prepared by the above processes (1) or (2).

The present invention will now be described in detail.

The "branching parameter G" used in the present invention is defined to a ratio of the limiting viscosity number $[\eta]$ of a polycarbonate prepared to that $[\eta]_{lin}$ of a linear polycarbonate having a weight-average molecular weight equal to that of the above polycarbonate, i.e., by $G=[\eta]/[\eta]_{lin}$. When the dihydric phenol is bisphenol A, the limiting viscosity number $[\eta]_{lin}$ was calculated based on the Schultz viscosity equation: $[\eta]=0.11\times10^{-4}$ $Mw^{0.82}$ (wherein Mw represents a weight-average molecular weight), assuming that the molecular weight distribution obeys the Schultz-Zimm exponential distribution. With respect to a copolymer and a homopolymer prepared from other dihydric phenols, a viscosity equation was determined from the limiting viscosity numbers and weight-average molecular weights of linear polycarbonates prepared by the interfacial polycondensation process and the branching parameter G was calculated based on the viscosity equation in the same manner as that described above. The weight-average molecular weight (Mw) can also be determined by the GPC method using a universal calibration curve as well as the light scattering method and the influence due to a difference in the method of measurement Was within experimental error.

Taking into account the fact that a polycarbonate having a branching parameter G of 0.8 to 1.0 generally behaves as a Newtonian fluid in a molten state, and the experimental error in measuring the weight-average molecular weight and the experimental error and the influence of the molecular weight distribution in measuring the limiting viscosity number, a polycarbonate having a branching parameter of 0.8 to 1.0 is concluded to be substantially free from any branched structure (i.e., to be linear). The linear polycarbonate is preferably one having a branching parameter G of 0.88 to 1.0, still preferably one having a branching parameter exceeding 0.9 and up to 1.0.

On the other hand, remarkably a polycarbonate having a branching parameter G below the above range generally exhibits a pronounced behavior as a non-Newtonian fluid in a molten state though the effect depends on the molecular weight. Such a polycarbonate is regarded to have, substantially, a branched structure (i.e., to be branched) even in consideration of the experimental error in measuring the weight-average molecular weight and the experimental error and the influence of the molecular weight distribution in measuring the limiting viscosity number. A polycarbonate having a branching parameter G of less than 0.1 is a product resulting from the undesirable phenomenon that polycarbonate prepolymers are crosslinked with each other during polymerization, thus being unfavorable.

The polycarbonate of the present invention has a branching parameter G of 0.1 to 1.0 and satisfies at least one of the following requirements (A) to (C):

(A) the terminal hydroxyl groups are present in an amount of 20 mole % or below based on all the terminal groups of the polycarbonate, (B) the chlorine ion concentration in the polycarbonate is 10 ppm or below, and (C) the total of the alkali metal ion concentration and the alkaline earth metal ion concentration in the polycarbonate is 1 ppm or below.

A polycarbonate not satisfying the above requirement (A) is liable to be discolored in the molding thereof at a high temperature and to lower in its molecular weight.

A polycarbonate not satisfying the above requirement (B) is sometimes significantly discolored in the molding thereof.

Further, a polycarbonate not satisfying the above requirement (C) sometimes has the formation of a branched structure due to a side reaction (which is different from the desired branched structure) and is sometimes significantly discolored.

The processes (1) and (2) described above are useful as the process for preparing the polycarbonate of the present invention.

Next, the raw materials, catalysts and other materials to be used in the processes (1) and (2) of the present invention will be described.

Among dihydric phenols to be used in the present invention, bisphenol A (2,2-bis(4-hydroxyphenyl)propane) is generally used, and, in addition, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)-4-methylpentane, 2,2-bis(4-hydroxyphenyl)octane, bis(4-hydroxyphenyl)phenylmethane, 4,4'-dihydroxy-2,2,2-triphenylethane, 2,2-bis(3-bromo-4-hydroxyphenyl)propane, 2,2-bis(3,5-dibromo-4-hydroxyphenyl)propane, 1,1-bis(4-hydroxy-3-methylphenyl)propane, 2,2-bis(4-hydroxy-3-methylphenyl)propane, 2,2-bis(4-hydroxy-3-isopropylphenyl)propane, 2,2-bis(4-hydroxy-3-Sec.-butylphenyl)propane, 2,2-bis(3,5-dimethyl-4-hydroxyphenyl)propane and 1,1-bis(4-hydroxy-3-tert-butylphenyl)propane; bis(hydroxyaryl)arenes such as 1,1-bis(4-hydroxyphenyl)-p-diisopropylbenzene, 1,1-bis(4-hydroxyphenyl)-p-diethylbenzene and 1,1-bis(4-hydroxyphenyl)-m-diisopropylbenzene; bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)cyclooctane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone can be used. These dihydric phenols may be used alone or as a mixture of two or more of them.

As the carbonic acid diester to be used in the present invention, for example, diphenyl carbonate, ditolyl carbonate, bis(chlorophenyl) carbonate, m-cresyl carbonate, dinaphthyl carbonate, dicyclohexyl carbonate, dimethyl carbonate, diethyl carbonate and dibutyl carbonate can be used. Among these carbonic acid diesters, diphenyl carbonate is generally used. These carbonic acid diesters may be used alone or as a mixture of two or more of them.

The amount of the carbonic acid diester to be used is generally 0.90 to 1.50 mol, preferably 0.95 to 1.25 mol per mole of the dihydric phenol.

If necessary, part of the carbonic acid diester may be replaced by a dicarboxylic acid or a dicarboxylic acid ester. In such a case, a polyester carbonate is obtained. The present invention also includes such polyester carbonates. Examples of the dicarboxylic acid and dicarboxylic acid ester include terephthalic acid, diphenyl terephthalate, isophthalic acid and diphenyl isophthalate. The amount of the dicarboxylic acid and dicarboxylic acid ester to be used is 50 mole % or below, preferably 30 mole % or below based on the carbonic acid diester.

In the preparation of the branched polycarbonate, a branching agent is used. The branching agent to be used in the present invention is a polyfunctional organic compound having at least three functional groups such as a hydroxyl group and a carboxyl group, preferably one having such a structure that the reaction of part of the functional groups does not affects the reactivity of the rest of the functional groups. Examples of the branching agent include polycarboxylic acids and derivatives thereof, such as trimellitic acid, trimellitic anhydride, triphenyl trimellitate, pyromellitic acid, pyromellitic anhydride and tetraphenyl pyromellitate; trishydroxyphenylalkanes such as 1,1,1-tris(4-hydroxyphenyl)ethane, 1,1,1-tris(4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, tris(4-hydroxyphenyl)ethane and tris(4-hydroxyphenyl)methane; and 1,4-bis(4',4"-dihydroxytriphenylmethyl)benzene, tetrakis(4-hydroxyphenyl)methane, 1-[α-methyl-α-(4'-hydroxyphenyl)ethyl]-4-[α', α'-bis(4"-hydroxyphenyl)ethyl]benzene and 1-[α,α-bis(4'-hydroxyphenyl)ethyl]-4-[α',α'-bis(4"-hydroxyphenyl)ethyl] benzene. These polyfunctional organic compounds may be used alone or as a mixture of two or more of them.

The amount of the branching agent to be used is $5 \times 10^{-4}$ to $2 \times 10^{-2}$ mol per mole of the dihydric phenol.

The amine compound which serves as the nitrogenous basic compound (a) to be used in the present invention as a catalyst is not particularly limited but may be any one so far as it is electron donative. Examples of the electron-donative amine compound include pyridine, 4-aminopyridine, 2-aminopyridine, 4-dimethylaminopyridine, 4-diethylaminopyridine, 4-pyrrolidinopyridine, 2-hydroxypyridine, 4-hydroxypyridine, 2-methoxypyridine, 4-methoxypyridine, picoline, pyrimidine, imidazole, 2-methylimidazole, 4-methylimidazole, 2-dimethylaminoimidazole, 2-methoxyimidazole, 2-mercaptoimidazole, pyrazole, aminoquinoline, benzimidazole, N,N-dimethylaniline, pyrrolidine, morpholine, N-methylmorpholine, piperidine, piperazine, 1,8-diazabicyclo[5.4.0]-7-undecene (DBU) and 1,5-diazabicyclo[4.3.0]-5-nonene (DBN). These electron-donative amine compounds may be used alone or as a mixture of two or more of them.

Although the nitrogenous basic compound (a) may be used together with other catalyst(s), when the nitrogenous basic compound (a) is used as the catalyst, it is preferable that the nitrogenous basic compound (a) be used alone except in the cases where use is made of the nitrogenous basic compound (a) together with a compound (b) containing an element selected from the group consisting of Groups IIb, IVb and Vb of the periodic table or a compound (c) containing an element selected from the group consisting of alkali metals and alkaline earth metals, which will be described below.

In the present invention, a compound (b) containing an element selected from the group consisting of Groups IIb, IVb and Vb of the periodic table may be used as the catalyst. It is no matter whether this compound is organic or inorganic.

Elements belonging to Group IIb of the periodic table include zinc, cadmium and so forth. Preferable Group IIb elements include zinc and cadmium.

The zinc compound includes, for example, zinc acetate, zinc oxalate, zinc phenylacetate, zinc chloride, zinc sulfate, zinc nitrate, zinc carbonate, zinc oxide, zinc hydroxide, zinc stearate, zinc chromium oxide and zinc chromium copper oxide.

The cadmium compound includes, for example, cadmium acetate, cadmium oxalate, cadmium oxide and cadmium stearate.

Elements belonging to Group IVb include silicon, germanium, tin and lead. Preferable Group IVb elements include copper and lead.

The silicon compound includes, for example, silicon oxide, silicon aluminum oxide ($SiO_2$—$Al_2O_3$) and silicon magnesium oxide ($SiO_2$—$MgO$) and the germanium compound includes, for example, germanium oxide and germanium hydroxide.

The tin compound includes tin-containing organic and inorganic compounds such as stannous acetate, stannous oxalate, tin caprylate, stannous chloride, stannic chloride, stannous oxide, stannic oxide and tetraphenyltin.

Representative examples of the lead compound include lead acetate, lead borate, lead citrate, lead hydroxide, lead oxide, lead phosphate, lead phthalate and lead stearate.

Elements belonging to Group Vb include antimony and bismuth. The antimony compound includes, for example, antimony acetate, antimony oxalate, triphenylantimony, antimony trioxide, antimony pentaoxide, triphenoxy-antimony, trimethoxyantimony, triethoxyantimony and antimony trichloride.

The bismuth compound includes bismuth-containing organic and inorganic compounds such as bismuth acetate, bismuth oxalate, triphenylbismuth, triphenoxybismuth, bismuth trioxide and bismuth trichloride.

According to the process (1) of the present invention, the melt polycondensation of a dihydric phenol with a carbonic acid diester is conducted by the use of a nitrogenous basic compound (a) and/or a compound (b) containing an element selected from the group consisting of Groups IIb, IVb and Vb of the periodic table as a catalyst(s). The nitrogenous basic compound (a) and the compound (b) containing an element selected from the group consisting of Groups IIb IVb and Vb of the periodic table may be each used irrespective of either as one kind of compound or as a mixture of two or more kinds of them. Further, the compound (b) containing an element selected from the group consisting of Groups IIb, IVb and Vb of the periodic table may be a catalyst system comprising a combination of a plurality of compounds containing the same element or different elements.

The amount of the nitrogenous basic compound (a) to be used in the process (1) may be within such a range as not to hinder the polycondensation. For example, the amount of the nitrogenous basic compound (a) to be used is $10^{-7}$ to $10^{-1}$ mol, preferably $10^{-6}$ to $10^{-2}$ mol per mole of the dihydric phenol. When the amount of the nitrogenous basic compound (a) to be used is less than $10^{-7}$ mol, a prolonged reaction at a temperature of as high as 220° to 300° C. will be necessary to prepare a polycarbonate having a desired degree of polymerization, e.g., one having a weight-average molecular weight of about 5,000 to 50,000, which is disadvantageous to the industrial preparation of polycarbonates. On the contrary, when the amount exceeds $10^{-1}$ mol, the amount of residual catalyst in the resulting polycarbonate will be increased, whereby the properties of the polycarbonate are apt to be impaired.

Further, the amount of the compound (b) containing an element selected from the group consisting of Groups IIb, IVb and Vb of the periodic table to be used is $10^{-8}$ to $10^{-2}$ mol, preferably $10^{-7}$ to $10^{-3}$ mol per mole of the dihydric phenol. When the amount of these compounds to be used is less than $10^{-8}$ mol, it will take a prolonged time to prepare a polycarbonate having a desired degree of polymerization, which is disadvantageous to the industrial preparation of polycarbonates. On the contrary, when the amount exceeds $10^{-2}$ mol, the amount of residual catalyst in the resulting polycarbonate will be increased, whereby the properties of the polycarbonate are apt to be impaired.

In the present invention, a compound (c) containing an element selected from the group consisting of alkali metals and alkaline earth metals may be used together with the above nitrogenous basic compound (a) as the catalyst.

The compound containing an alkali metal includes sodium hydroxide, potassium hydroxide, lithium hydroxide, sodium acetate, potassium acetate, lithium acetate, sodium hydrogencarbonate, potassium hydrogencarbonate, lithium hydrogencarbonate, sodium stearate, potassium stearate, lithium stearate, sodium borate, potassium borate, lithium borate, sodium borohydride, potassium borohydride, lithium borohydride, sodium benzoate, potassium benzoate and lithium benzoate.

The compound containing an alkaline earth metal includes calcium hydroxide, barium hydroxide, magnesium hydroxide, strontium hydroxide, calcium acetate, barium acetate, magnesium acetate, strontium acetate, calcium stearate, barium stearate, magnesium stearate and strontium stearate.

According to the process (2) of the present invention, the melt polycondensation of a dihydric phenol with a carbonic acid diester is conducted in the presence of a catalyst system comprising a combination of a nitrogenous basic compound (a) with a compound (c) containing an element selected from the group consisting of alkali metals and alkaline earth metals. The nitrogenous basic compound (a) and the compound (c) containing an element selected from the group consisting of alkali metals and alkaline earth metals may be each used each irrespective of each other as one kind of compound or as a mixture of two or more kinds of compounds.

The amount of the nitrogenous basic compound (a) to be used in the process (2) may be the same as that in the process (1).

Further, the amount of the compound (c) containing an element selected from the group consisting of alkali metals and alkaline earth metals to be used is, for example, about $10^{-8}$ to $10^{-5}$ mol, preferably about $10^{-8}$ to $10^{-6}$ mol per mole of the dihydric phenol. When the amount of these compounds to be used is less than $10^{-8}$ mol, it will take a prolonged time to prepare a polycarbonate having a desired degree of polymerization, which is disadvantageous to the industrial preparation of polycarbonates. On the contrary, when the amount exceeds $10^{-5}$ mol, an unsatisfactory amount of a branched structure will be formed by a side reaction.

In the process (2), it is preferable that the melt polycondensation of a dihydric phenol with a carbonic acid diester be conducted in the presence of a compound represented by the above general formulas (I) or (II).

The compound represented by the general formula (I) includes alkyl phenyl ethers such as methyl phenyl ether, ethyl phenyl ether, propyl phenyl ether, isopropyl phenyl ether, butyl phenyl ether, isobutyl phenyl ether, sec-butyl phenyl ether, tert-butyl phenyl ether, pentyl phenyl ether, heptyl phenyl ether, octyl phenyl ether and ethyl-4-methylphenyl ether, and the compound represented by the general formula (II) includes diphenyl ethers such as diphenyl ether, 4,4'-dimethylphenyl ether, 4-methyldiphenyl ether, 4-ethyl-4'-methyldiphenyl ether and 4-ethyldiphenyl ether, though the compounds represented by the general formulas (I) and (II) are not limited by those described above. These compounds represented by the general formulas (I) or (II) may be used alone or as a mixture of two or more of them.

The amount of the compound represented by the general formula (I) or (II) to be used may be within such a range as not to impair the properties of the resulting polycarbonate. For example, this amount is about $10^{-8}$ to $10^{-1}$ mol, preferably about $10^{-7}$ to $10^{-2}$ mol per mole of the dihydric phenol. When the amount of these compound to be used is less than $10^{-8}$ mol, the side reaction depressing effect will be so little that an unsatisfactory amount of a branched structure will be formed by a side reaction. On the contrary, when the amount exceeds $10^{-1}$ mol, the amount of these compounds remaining in the resulting polycarbonate will be increased, whereby the properties of the polycarbonate are apt to be impaired.

The transesterification may be conducted by any process which is conventionally employed in the melt polycondensation, for example, a process which comprises carrying out the reaction at about 80° to 250° C., preferably about 100° to 230° C. in an early stage, heating the resulting mixture while evacuating the reaction system, and finally carrying out the reaction at about 250° to 320° C. The degree of vacuum at the completion of the reaction is preferably, e.g., 0.3 Torr or below.

When such a transesterification is conducted, polycondensation proceeds smoothly to give a high-molecular-weight polycarbonate which is not discolored and is substantially free from chlorine ions and any branched structure that might be formed by a side reaction.

The present invention provides a high-molecular-weight linear polycarbonate which is not discolored, does not contain chlorine ions causative of discoloration, and is free from any branched structure that might be formed by a side reaction, and a process for the preparation of the linear polycarbonate of the present invention which comprises using a specific catalyst and so on.

Further, the present invention provides a branched polycarbonate which is not discolored, does not contain chlorine ions causative of discoloration, and has a branched structure formed not by a side reaction but by using a polyfunctional organic compound having at least three functional groups as a branching agent and which is suitable for the production of a hollow molding, and a process for the preparation of the branched polycarbonate of the present invention which comprises using a specific catalyst and so on.

EXAMPLE

The present invention will now be described in more detail by referring to the following Examples, though the present invention is not limited by them.

Example A

This example illustrates the effect of a nitrogenous basic compound in the preparation of a linear polycarbonate.
(1)
45.66 g (0.20 mol) of 2,2-bis(4-hydroxyphenyl)propane and 44.99 g (0.21 mol) of diphenyl carbonate were put in a flask having a capacity of 300 ml, followed by the addition of $4.8 \times 10^{-3}$ g ($4 \times 10^{-5}$ mol) of 4-dimethylaminopyridine as a catalyst. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. and 0.2 Torr for 2 hours, thus giving a colorless transparent polycarbonate.
(2) to (4)
Every colorless transparent polycarbonate was obtained by repeating the same procedure as that of (1) except that the catalyst and the reaction time after the heating and evacuating to 270° C. and 0.2 Torr were varied as will be described below. More specifically, the polycondensation was conducted under the conditions that the catalyst was $8.2 \times 10^{-3}$ g ($1 \times 10^{-4}$ mol) of 2-methylimidazole and the reaction time was 3 hours in (2), the catalyst was $6.8 \times 10^{-3}$ g ($1 \times 10^{-4}$ mol) of imidazole and the reaction time was 3 hours in (3), or the catalyst was $1.2 \times 10^{-3}$ g ($1 \times 10^{-5}$ mol) of 4-dimethylaminopyridine and the reaction time was 5 hours in (4).
(5) and (6)
A polycarbonate was obtained by repeating the same procedure as that of (1) except that the catalyst and the reaction time after the heating and evacuating to 270° C. and 0.2 Torr were varied as will be described below. More specifically, the polycondensation was conducted under the conditions that the catalyst was $1.6 \times 10^{-4}$ g ($4 \times 10^{-6}$ mol) of sodium hydroxide and the reaction time was 2 hours in (5), or the catalyst was $4.0 \times 10^{-4}$ g ($4 \times 10^{-6}$ mol) of sodium acetate and the reaction time was 2 hours in (6).

Table 1 shows the limiting viscosity number, weight-average molecular weight, branching parameter G, molecular weight distribution Mw/Mn as determined by gel permeation chromatography, total value ($M^+$) of alkali metal ion concentration and alkaline earth metal ion concentration, and hue of each of the polycarbonates obtained in the above (1) to (6).

TABLE 1

| Classification | Limiting viscosity number [η] (dl/g) | Wt.-av. mol. wt. Mw | Mol. wt. distr. Mw/Mn | Branching parameter G | Total value of alkali metal ion concn. and alkaline earth metal ion concn. [M+] (ppm) | Hue |
|---|---|---|---|---|---|---|
| A-(1) | 0.48 | 29,800 | 2.65 | 0.95 | 0.1 | colorless transparent |
| A-(2) | 0.47 | 28,600 | 2.60 | 0.96 | 0.1 | colorless transparent |
| A-(3) | 0.47 | 28,400 | 2.65 | 0.97 | 0.1 | colorless transparent |
| A-(4) | 0.53 | 34,200 | 2.80 | 0.91 | 0.1 | colorless transparent |
| A-(5) | 0.47 | 43,800 | 3.50 | 0.68 | 2.4 | pale-yellow transparent |
| A-(6) | 0.54 | 54,200 | 4.40 | 0.66 | 3.2 | pale-yellow transparent |

It can be understood from the results of Table 1 that the hues of polycarbonates A-(1) to (4) were colorless and transparent, although those of polycarbonates A-(5) and (6) were pale yellow and transparent, thus proving that polycarbonates A-(1) to (4) were less discolored. Further, it can be understood that the polycarbonates A-(1) to (4) were linear.

Example B

This example illustrates the effect of a compound containing an element selected from the group consisting of Groups IIb, IVb and Vb in the preparation of linear polycarbonate.

(1)

45.66 g (0.20 mol) of 2,2-bis(4-hydroxyphenyl)propane and 42.99 g (0.21 mol) of diphenyl carbonate were put in a flask having a capacity of 300 ml, followed by the addition of $6.0\times10^{-4}$ g ($2\times10^{-6}$ mol) of antimony oxide as a catalyst. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. at 0.2 Torr for 1.5 hours, thus giving a colorless transparent polycarbonate.

(2) to (5)

Every colorless transparent polycarbonate was obtained by repeating the same procedure as that of (1) except that the catalyst was varied as will be described below. More specifically, use was made, as the catalyst, of $4.7\times10^{-4}$ g ($2\times10^{-6}$ mol) of stannous acetate in (2), $7.6\times10^{-4}$ g ($2\times10^{-6}$ mol) of lead acetate in (3), $4.4\times10^{-4}$ g ($2\times10^{-6}$ mol) of zinc acetate in (4), or $1.17\times10^{-3}$ g ($4\times10^{-6}$ mol) of antimony trioxide in (5).

(6) to (8)

A polycarbonate was obtained by repeating the same procedure as that of (1) except that the catalyst was varied as will be described below. More specifically, use was made, as the catalyst, of $4.0\times10^{-4}$ g ($4\times10^{-6}$ mol) of potassium acetate in (6), $2.6\times10^{-4}$ g ($4\times10^{-6}$ mol) of lithium acetate in (7), or $2.8\times10^{-4}$ g ($2\times10^{-6}$ mol) of potassium carbonate in (8).

Table 2 shows the limiting viscosity number, weight-average molecular weight, branching parameter G, molecular weight distribution Mw/Mn (weight-average molecular weight/number-average molecular weight) as determined by gel permeation chromatography, total value (M+) of alkali metal ion concentration and alkaline earth metal ion concentration, and hue of each of the polycarbonates obtained in the above (1) to (8).

TABLE 2

| Classification | Limiting viscosity number [η] (dl/g) | Wt.-av. mol. wt. Mw | Mol. wt. distr. Mw/Mn | Branching parameter G | Total value of alkali metal ion concn. and alkaline earth metal ion concn. [M+] (ppm) | Hue |
|---|---|---|---|---|---|---|
| B-(1) | 0.50 | 31,000 | 2.65 | 0.96 | 0.1 | colorless transparent |
| B-(2) | 0.52 | 35,200 | 2.75 | 0.91 | 0.1 | colorless transparent |
| B-(3) | 0.56 | 38,600 | 2.80 | 0.91 | 0.1 | colorless transparent |
| B-(4) | 0.53 | 34,600 | 2.75 | 0.93 | 0.1 | colorless transparent |
| B-(5) | 0.49 | 31,800 | 2.65 | 0.92 | 0.1 | colorless transparent |
| B-(6) | 0.54 | 54,200 | 4.40 | 0.66 | 3.4 | pale-yellow transparent |
| B-(7) | 0.47 | 44,100 | 3.75 | 0.68 | 2.9 | pale-yellow transparent |
| B-(8) | 0.58 | 71,300 | 5.50 | 0.57 | 5.2 | pale-yellow transparent |

It can be understood from the results of the Table 2 that the polycarbonates B-(1) to (5) were less discolored than the polycarbonates B-(6) to (8) and were linear.

Example C

This example illustrates the effect of the simultaneous use of a nitrogenous basic compound and a compound containing an element selected from the group consisting of Groups IIb, IVb and Vb in the preparation of linear polycarbonate.

(1)

45.66 g (0.20 mol) of 2,2-bis(4-hydroxyphenyl)propane and 42.99 g (0.21 mol) of diphenyl carbonate were put in a flask having a capacity of 300 ml, followed by the addition of $1.2\times10^{-3}$ g ($1\times10^{-5}$ mol) of 4-dimethylaminopyridine and $6.0\times10^{-4}$ g ($2\times10^{-6}$ mol) of antimony acetate as catalysts. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. at 0.2 Torr for 1.5 hours, thus giving a colorless transparent polycarbonate.

(2) to (5)

Every colorless transparent polycarbonate was obtained by repeating the same procedure as that of (1) except that the catalyst was varied as will be described below. More specifically, use was made, as the catalysts, of $1.2\times10^{-3}$ g ($1\times10^{-5}$ mol) of 4-dimethylaminopyridine and $4.7\times10^{-4}$ g ($2\times10^{-6}$ mol) of stannous acetate in (2), $1.2\times10^{-3}$ g ($1\times10^{-5}$ mol) of 4-dimethylaminopyridine and $7.6\times10^{-4}$ g ($2\times10^{-6}$ mol) of lead acetate in (3), $1.2\times10^{-3}$ g ($1\times10^{-5}$ mol) of 4-dimethylaminopyridine and $4.4\times10^{-4}$ g ($2\times10^{-6}$ mol) of zinc acetate in (4), or $1.2\times10^{-3}$ g ($1\times10^{-5}$ mol) of 4-dimethylaminopyridine and $1.17\times10^{-4}$ g ($4\times10^{-6}$ mol) of antimony trioxide in (5).

(6) to (8)

A polycarbonates was obtained by repeating the same procedure as that of (1) except that the catalyst was varied as will be described below. More specifically, use was made, as the catalyst(s), of $4.0\times10^{-4}$ g ($4\times10^{-6}$ mol) of potassium acetate in (6), $1.2\times10^{-3}$ g ($1\times10^{-5}$ mol) of 4-dimethylaminopyridine and $2.6\times10^{-4}$ g ($4\times10^{-6}$ mol) of lithium acetate in (7), or $1.2\times10^{-3}$ g ($1\times10^{-5}$ mol) of 4-dimethylaminopyridine and $2.8\times10^{-4}$ g ($2\times10^{-6}$ mol) of potassium carbonate in (8).

Table 3 shows the limiting viscosity number, weight-average molecular weight, branching parameter G, molecular weight distribution Mw/Mn (weight-average molecular weight/number-average molecular weight) as determined by gel permeation chromatography, total value ($M^+$) of alkali metal ion concentration and alkaline earth metal ion concentration, and hue of each of the polycarbonates obtained in the above (1) to (8).

Example D

This example is one for illustrating the effect attained by conducting the reaction with the combined use of a nitrogenous basic compound and a compound containing an element selected from the group consisting of alkali metals and alkaline earth metals as catalysts in the presence of a compound represented by the above general formulas (I) or (II) in the preparation of linear polycarbonate.

(1)

45.66 g (0.20 mol) of 2,2-bis(4-hydroxyphenyl)propane and 44.99 g (0.21 mol) of diphenyl carbonate were put in a flask having a capacity of 300 ml, followed by the addition of $1.2\times10^{-3}$ g ($1.0\times10^{-5}$ mol) of 4-dimethylaminopyridine, $2.0\times10^{-5}$ g ($2.0\times10^{-7}$ mol) of potassium acetate and $5.0\times10^{-3}$ g ($4.6\times10^{-5}$ mol) of methyl phenyl ether. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. and 0.2 Torr for 1.5 hours, thus giving a colorless transparent polycarbonate.

(2) to (5)

Every colorless transparent polycarbonate was obtained by repeating the same procedure as that of (1) except that the catalyst and the additive were varied as will be described below. More specifically, use was made of $1.2\times10^{-3}$ g ($1.0\times10^{-5}$ mol) of 4-dimethylaminopyridine, $3.2\times10^{-5}$ g ($4.0\times10^{-7}$ mol) of sodium acetate and $1.0\times10^{-3}$ g ($9.2\times10^{-6}$ mol) of methyl phenyl ether in (2), $1.2\times10^{-3}$ g ($1.0\times10^{-5}$ mol) of 4-dimethylaminopyridine, $8.0\times10^{-5}$ g ($4.0\times10^{-7}$ mol) of sodium borate and $3.6\times10^{-3}$ g ($2.4\times10^{-5}$ mol) of t-butyl phenyl ether in (3), $1.2\times10^{-3}$ g ($1.0\times10^{-5}$ mol) of 4-dimethylaminopyridine, $2.0\times10^{-4}$ g ($1.0\times10^{-6}$ mol) of magnesium acetate and $2.6\times10^{-3}$ g ($2.4\times10^{-5}$ mol) of methyl phenyl ether in (4), or $1.2\times10^{-3}$ g ($1.0\times10^{-5}$ mol) of 4-dimethylaminopyridine, $1.0\times10^{-5}$ g ($1.0\times10^{-7}$ mol) of potassium acetate and $1.6\times10^{-3}$ g ($9.2\times10^{-6}$ mol) of diphenyl ether in (5).

(6) and (7)

A polycarbonate was obtained by repeating the same procedure as that of (1) except that the catalyst was varied

TABLE 3

| Classification | Limiting viscosity number [η] (dl/g) | Wt.-av. mol. wt. Mw | Mol. wt. distr. Mw/Mn | Branching parameter G | Total value of alkali metal ion concn. and alkaline earth metal ion concn. [M$^+$] (ppm) | Hue |
| --- | --- | --- | --- | --- | --- | --- |
| C-(1) | 0.63 | 41,900 | 2.75 | 0.95 | 0.1 | colorless transparent |
| C-(2) | 0.58 | 40,000 | 2.80 | 0.91 | 0.1 | colorless transparent |
| C-(3) | 0.66 | 48,800 | 3.00 | 0.88 | 0.1 | colorless transparent |
| C-(4) | 0.59 | 41,400 | 2.85 | 0.89 | 0.1 | colorless transparent |
| C-(5) | 0.55 | 34,500 | 2.70 | 0.97 | 0.1 | colorless transparent |
| C-(6) | 0.62 | 80,500 | 5.50 | 0.55 | 4.8 | pale-yellow transparent |
| C-(7) | 0.58 | 60,100 | 4.30 | 0.68 | 3.7 | pale-yellow transparent |
| C-(8) | 0.63 | 90,300 | 6.75 | 0.51 | 5.2 | pale-yellow transparent |

It can be understood from the results of the Table 3 that the polycarbonates of C-(1) to (5) were less discolored than those of C-(6) to (8), and were linear.

as will be described below and no additive was used. More specifically, use was made, as the catalyst(s), of $1.0\times10^{-3}$ g ($1.0\times10^{-5}$ mol) of potassium acetate in (6), or $1.2\times10^{-3}$ g ($1.0\times10^{-5}$ mol) of 4-dimethylaminopyridine and $8.4\times10^{-4}$ g ($1.0\times10^{-5}$ mol) of sodium hydrogencarbonate in (7).

Table 4 shows the limiting viscosity number, weight-average molecular weight, branching parameter G, molecular weight distribution Mw/Mn as determined by gel permeation chromatography, total value ($M^+$) of alkali metal ion concentration and alkaline earth metal ion concentration, and hue of each of the polycarbonates obtained in the above (1) to (7).

TABLE 4

| Classification | Limiting viscosity number [η] (dl/g) | Wt. - av. mol. wt. Mw | Mol. wt. distr. Mw/Mn | Branching parameter G | Total value of alkali metal ion concn. and alkaline earth metal ion concn. [$M^+$] (ppm) | Hue |
|---|---|---|---|---|---|---|
| D-(1) | 0.73 | 52,300 | 2.85 | 0.91 | 0.1 | colorless transparent |
| D-(2) | 0.63 | 44,700 | 2.75 | 0.90 | 0.1 | colorless transparent |
| D-(3) | 0.61 | 41,500 | 2.70 | 0.93 | 0.2 | colorless transparent |
| D-(4) | 0.54 | 34,200 | 2.60 | 0.96 | 0.3 | colorless transparent |
| D-(5) | 0.62 | 39,800 | 2.65 | 0.97 | 0.1 | colorless transparent |
| D-(6) | 0.55 | 49,600 | 3.50 | 0.72 | 5.2 | pale-yellow transparent |
| D-(7) | 0.56 | 58,300 | 4.40 | 0.64 | 3.8 | pale-yellow transparent |

It can be understood from the results of Table 4 that the polycarbonates of D-(1) to (5) were less discolored than those of D-(6) and (7), and were linear.

Example E

This example is one for illustrating the effect of a nitrogenous basic compound in the preparation of branched polycarbonate.

(1)

45.66 g (0.20 mol) of 2,2-bis(4-hydroxyphenyl)propane, 44.99 g (0.21 mol) of diphenyl carbonate and 0.45 g ($1.47 \times 10^{-3}$ mol) of 1,1,1-tris(4-hydroxyphenyl)ethane were put in a flask having a capacity of 300 ml, followed by the addition of $4.8 \times 10^{-3}$ g ($4 \times 10^{-5}$ mol) of 4-dimethylaminopyridine as a catalyst. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. and 0.2 Torr for 2 hours, thus giving a colorless transparent polycarbonate.

(2) to (4)

Every colorless transparent polycarbonate was obtained by repeating the same procedure as that of (1) except that the kinds and amounts of the catalyst and the additive were varied as will be described below. More specifically, use was made of $2.4 \times 10^{-3}$ g ($2 \times 10^{-5}$ mol) of 4-dimethylaminopyridine and 0.48 g ($1 \times 10^{-3}$ mol) of α,α',α''-tris(4-hydroxyphenyl)-1,3,5-triisopropylbenzene in (2), $3.0 \times 10^{-3}$ g ($2 \times 10^{-5}$ mol) of 4-pyrrolidinopyridine and 0.61 g ($2 \times 10^{-3}$ mol) of 1,1,1-tris(4-hydroxyphenyl)ethane in (3), or $8.2 \times 10^{-3}$ g ($1 \times 10^{-4}$ mol) of 2-methylimidazole and 0.31 g ($1 \times 10^{-3}$ mol) of 1,1,1-tris(4-hydroxyphenyl)ethane in (4).

(5)

A colorless transparent polycarbonate was obtained by repeating the same procedure as that of (1) except that no branching agent was added.

(6)

A polycarbonate was obtained by repeating the same procedure as that of (1) except that the catalyst was replaced with $4.0 \times 10^{-4}$ g ($4 \times 10^{-6}$ mol) of potassium acetate and no branching agent was added.

Table 5 shows the limiting viscosity number, weight-average molecular weight, branching parameter G, total value ($M^+$) of alkali metal ion concentration and alkaline earth metal ion concentration, and hue of each of the polycarbonates obtained in the above (1) to (8).

TABLE 5

| Classification | Limiting viscosity number [η] (dl/g) | Wt. - av. mol. wt. Mw | Branching parameter G | Total value of alkali metal ion concn. and alkaline earth metal ion concn. [$M^+$] (ppm) | Hue |
|---|---|---|---|---|---|
| E-(1) | 0.45 | 50,500 | 0.58 | 0.1 | colorless transparent |
| E-(2) | 0.36 | 28,300 | 0.75 | 0.1 | colorless transparent |
| E-(3) | 0.34 | 31,600 | 0.65 | 0.1 | colorless transparent |
| E-(4) | 0.35 | 25,200 | 0.79 | 0.1 | colorless transparent |
| E-(5) | 0.48 | 29,800 | 0.95 | 0.1 | colorless transparent |
| E-(6) | 0.54 | 54,200 | 0.66 | 3.4 | pale-yellow transparent |

As is clear from Table 5, it can be understood that each of the polycarbonates obtained in E-(1) to (4) was not discolored and had a degree of branching suitable for the production of a hollow molding. Further, as understood from E-(5), the polycarbonates of E-(1) to (4) were substantially free from any branched structure that might be formed by a side reaction.

Example F

This example is one for illustrating the effect of a compound containing an element selected from the group consisting of Groups IIb, IVb and Vb in the preparation of branched polycarbonate.

(1)

45.66 g (0.20 mol) of 2,2-bis(4-hydroxyphenyl)propane, 44.99 g (0.21 mol) of diphenyl carbonate and 0.45 g ($1.47 \times 10^{-3}$ mol) of 1,1,1-tris(4-hydroxyphenyl)ethane were put in a flask having a capacity of 300 ml, followed by the addition of $6.0 \times 10^{-4}$ g ($2 \times 10^{-6}$ mol) of antimony acetate as a catalyst. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. at 0.2 Torr for 1.5 hours, thus giving a colorless transparent polycarbonate.

(2) to (4)

Every colorless transparent polycarbonate was obtained by repeating the same procedure as that of (1) except that the kinds and amounts of the catalyst and the branching agent were varied as will be described below. More specifically, use was made of $7.6 \times 10^{-4}$ g ($2 \times 10^{-6}$ mol) of lead acetate and 0.61 g ($2 \times 10^{-3}$ mol) of 1,1,1-tris(4-hydroxyphenyl)ethane in (2), $4.4 \times 10^{-4}$ g ($2 \times 10^{-6}$ mol) of zinc acetate and 0.31 g ($1 \times 10^{-3}$ mol) of 1,1,1-tris(4-hydroxyphenyl)ethane in (3), or $4.7 \times 10^{-4}$ g ($2 \times 10^{-6}$ mol) of stannous acetate and 0.48 g ($1 \times 10^{-3}$ mol) of $\alpha,\alpha',\alpha''$-tris(4-hydroxyphenyl)-1,3,5-triisopropylbenzene in (4).

(5) and (6)

A polycarbonates was obtained by repeating the same procedure as that of (1) except that the catalyst was varied as will be described below and no branching agent was added. More specifically, use was made, as the catalyst, of $6.0 \times 10^{-4}$ g ($2 \times 10^{-6}$ mol) of antimony acetate in (5), or $4.0 \times 10^{-4}$ g ($4 \times 10^{-6}$ mol) of potassium acetate in (6).

Table 6 shows the limiting viscosity number, weight-average molecular weight, branching parameter G, total value ($M^+$) of alkali metal ion concentration and alkaline earth metal ion concentration, and hue of each of the polycarbonates obtained in the above (1) to (6).

Example G

This example illustrates the effect of the simultaneous use of a nitrogenous basic compound and a compound having an element selected from the group consisting of Groups IIb, IVb and Vb in the preparation of branched polycarbonate.

(1)

45.66 g (0.20 mol) of 2,2-bis(4-hydroxyphenyl)propane, 44.99 g (0.21 mol) of diphenyl carbonate and 0.45 g ($1.47 \times 10^{-3}$ mol) of 1,1,1-tris(4-hydroxyphenyl)ethane were put in a flask having a capacity of 300 ml, followed by the addition of $1.2 \times 10^{-3}$ g ($1 \times 10^{-5}$ mol) of 4-dimethylaminopyridine and $6.0 \times 10^{-4}$ g ($2 \times 10^{-6}$ mol) of antimony acetate as catalysts. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 70° C. and 0.2 Torr, respectively, and polycondensation was effected finally at 270° C. at 0.2 Torr for 1.5 hours, thus giving a colorless transparent polycarbonate.

(2) to (4)

Every colorless transparent polycarbonate was obtained by repeating the same procedure as that of (1) except that the kinds and amounts of the catalyst and the branching agent were varied as will be described below. More specifically, use was made of $1.2 \times 10^{-3}$ g ($1 \times 10^{-5}$ mol) of 4-dimethylaminopyridine and $3.0 \times 10^{-4}$ g ($1 \times 10^{-6}$ mol) of antimony acetate, and 0.48 g ($1.0 \times 10^{-3}$ mol) of $\alpha,\alpha',\alpha''$-tris(4-hydroxyphenyl)-1,3,5-triisopropylbenzene in (2); $1.2 \times 10^{-3}$ g ($1 \times 10^{-5}$ mol) of 4-dimethylaminopyridine and $4.4 \times 10^{-4}$ g ($2 \times 10^{-6}$ mol) of zinc acetate, and 0.61 g ($2.0 \times 10^{-3}$ mol) of 1,1,1-tris(4-hydroxyphenyl)ethane in (3); or $1.2 \times 10^{-3}$ g ($1 \times 10^{-5}$ mol) of 4-dimethylaminopyridine and $1.17 \times 10^{-4}$ g ($4 \times 10^{-6}$ mol) of antimony trioxide, and 0.31 g ($1 \times 10^{-3}$ mol) of 1,1,1-tris(4-hydroxyphenyl)ethane in (4).

(5) and (6)

A polycarbonate was obtained by repeating the same procedure as that of (1) except that the catalyst was varied as will be described below and no branching agent was added. More specifically, use was made, as the catalyst(s), of $1.2 \times 10^{-3}$ g ($1 \times 10^{-5}$ mol) of 4-dimethylaminopyridine and $6.0 \times 10^{-4}$ g ($2 \times 10^{-6}$ mol) of antimony acetate in (5), or $4.0 \times 10^{-4}$ g ($4 \times 10^{-6}$ mol) of potassium acetate in (6).

(7)

TABLE 6

| Classification | Limiting viscosity number $[\eta]$ (dl/g) | Wt.-av. mol. wt. Mw | Branching parameter G | Total value of alkali metal ion concn. and alkaline earth metal ion concn. $[M^+]$ (ppm) | Hue |
| --- | --- | --- | --- | --- | --- |
| F-(1) | 0.47 | 52,200 | 0.59 | 0.1 | colorless transparent |
| F-(2) | 0.50 | 58,300 | 0.57 | 0.1 | colorless transparent |
| F-(3) | 0.39 | 37,700 | 0.65 | 0.1 | colorless transparent |
| F-(4) | 0.43 | 43,500 | 0.63 | 0.1 | colorless transparent |
| F-(5) | 0.50 | 31,000 | 0.96 | 0.1 | colorless transparent |
| F-(6) | 0.54 | 54,200 | 0.66 | 3.4 | pale-yellow transparent |

As is clear from Table 6, it can be understood that each of the polycarbonates obtained in F-(1) to (4) was not discolored and had a degree of branching suitable for the production of a hollow molding. Further, as understood from F-(5), the polycarbonates of F-(1) to (4) were substantially free from any branched structure that might be formed by a side reaction.

A polycarbonate was obtained by repeating the same procedure as that of (1) except that the catalyst was replaced with $4.0 \times 10^{-4}$ g ($4 \times 10^{-6}$ mol) of potassium acetate.

Table 7 shows the limiting viscosity number, weight-average molecular weight, branching parameter G, total value [M$^+$] of alkali metal ion concentration and alkaline earth metal ion concentration, and hue of each of the polycarbonates obtained in the above (1) to (7).

TABLE 7

| Classification | Limiting viscosity number [η] (dl/g) | Wt. - av. mol. wt. Mw | Branching parameter G | Total value of alkali metal ion concn. and alkaline earth metal ion concn. [M$^+$] (ppm) | Hue |
|---|---|---|---|---|---|
| G-(1) | 0.48 | 52,800 | 0.60 | 0.1 | colorless transparent |
| G-(2) | 0.34 | 29,200 | 0.70 | 0.1 | colorless transparent |
| G-(3) | 0.39 | 38,400 | 0.64 | 0.1 | colorless transparent |
| G-(4) | 0.48 | 43,000 | 0.71 | 0.1 | colorless transparent |
| G-(5) | 0.55 | 34,500 | 0.97 | 0.1 | colorless transparent |
| G-(6) | 0.54 | 54,200 | 0.66 | 3.4 | pale-yellow transparent |
| G-(7) | 0.59 | 78,500 | 0.53 | 3.6 | pale-yellow transparent |

As is clear from Table 7, it can be understood that each of the polycarbonates prepared in G-(1) to (4) was not discolored and had a degree of branching suitable for the production of a hollow molding. Further, as understood from G-(5), the polycarbonates of G-(1) to (4) were substantially free from any branched structure that might be formed by a side reaction.

Example H

This example illustrating the effect attained by conducting the reaction with the combined use of a nitrogenous basic compound and a compound containing an element selected from the group consisting of alkali metals and alkaline earth metals as catalysts in the presence of a compound represented by the above general formulas (I) or (II) in the preparation of branched polycarbonates.

(1)

45.66 g (0.20 mol) of 2,2-bis(4-hydroxyphenyl)propane, 44.99 g (0.21 mol) of diphenyl carbonate and 0.45 g ($1.47 \times 10^{-3}$ mol) of 1,1,1-tris(4-hydroxyphenyl)ethane were put in a flask having a capacity of 300 ml, followed by the addition of $1.2 \times 10^{-3}$ g ($1.0 \times 10^{-5}$ mol) of 4-dimethylaminopyridine, $2.0 \times 10^{-5}$ g ($2.0 \times 10^{-7}$ mol) of potassium acetate and $5.0 \times 10^{-3}$ g ($4.6 \times 10^{-5}$ mol) of methyl phenyl ether. The air in the flask was purged with nitrogen and the contents in the flask was heated to 160° C. After melting the raw materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. and 0.2 Torr for 1.5 hours, thus giving a colorless transparent polycarbonate.

(2) to (5)

Every colorless transparent polycarbonate was obtained by repeating the same procedure as that of (1) except that the branching agent, the catalyst and the additive were varied as will be described below. More specifically, use was made of 0.61 g ($2.0 \times 10^{-3}$ mol) of 1,1,1-tris(4-hydroxyphenyl)ethane, $1.2 \times 10^{-3}$ g ($1.0 \times 10^{-5}$ mol) of 4-dimethylaminopyridine, $3.2 \times 10^{-5}$ g ($4.0 \times 10^{-7}$ mol) of sodium acetate and $1.0 \times 10^{-3}$ g ($9.2 \times 10^{-6}$ mol) of methyl phenyl ether in (2), 0.31 g ($1.0 \times 10^{-3}$ mol) of 1,1,1-tris(4-hydroxyphenyl)ethane, $1.2 \times 10^{-3}$ g ($1.0 \times 10^{-5}$ mol) of 4-dimethylaminopyridine, $8.0 \times 10^{-5}$ g ($4.0 \times 10^{-7}$ mol) of sodium borate and $3.6 \times 10^{-3}$ g ($2.4 \times 10^{-5}$ mol) of t-butyl phenyl ether in (3), 0.48 g ($1.0 \times 10^{-3}$ mol) of α,α',α"-tris(4-hydroxyphenyl)-1,3,5-triisopropylbenzene, $1.2 \times 10^{-3}$ g ($1.0 \times 10^{-5}$ mol) of 4-dimethylaminopyridine, $2.0 \times 10^{-4}$ g ($1.0 \times 10^{-6}$ mol) of magnesium acetate and $2.6 \times 10^{-3}$ g ($2.4 \times 10^{-5}$ mol) of methyl phenyl ether in (4), or 0.96 g ($2.0 \times 10^{-3}$ mol) of α,α',α"-tris(4-hydroxyphenyl)-1,3,5-triisopropylbenzene, $1.2 \times 10^{-3}$ g ($1.0 \times 10^{-5}$ mol) of 4-dimethylaminopyridine, $1.0 \times 10^{-5}$ g ($1.0 \times 10^{-7}$ mol) of potassium acetate and $1.6 \times 10^{-3}$ g ($9.2 \times 10^{-6}$ mol) of diphenyl ether in (5).

(6) and (7)

In (6), a colorless transparent polycarbonate was obtained by repeating the same procedure as that of (1) except that 1,1,1-tris(4-hydroxyphenyl)ethane as a branching agent was not added. In (7), a colorless transparent polycarbonate was obtained by repeating the same procedure as that of (4) except that α,α',α"-tris(4-hydroxyphenyl)-1,3,5-triisopropylbenzene as a branching agent was not added.

(8) and (9)

A polycarbonate was obtained by repeating the same procedure as that of (1) except that the catalyst was varied as will be described below and neither a branching agent nor an additive was used. More specifically, use was made, as the catalyst(s), of $1.0 \times 10^{-3}$ g ($1.0 \times 10^{-5}$ mol) of potassium acetate in (8), or $1.2 \times 10^{-3}$ g ($1.0 \times 10^{-5}$ mol) of 4-dimethylaminopyridine and $8.4 \times 10^{-4}$ g ($1.0 \times 10^{-5}$ mol) of sodium hydrogencarbonate in (9).

Table 8 shows the limiting viscosity number, weight-average molecular weight, branching parameter G, total value [M$^+$] of alkali metal ion concentration and alkaline earth metal ion concentration, and hue of each of the polycarbonates obtained in the above (1) to (9).

TABLE 8

| Classification | Limiting viscosity number [η] (dl/g) | Wt.-av. mol. wt. Mw | Branching parameter G | Total value of alkali metal ion concn. and alkaline earth metal ion concn. [M$^+$] (ppm) | Hue |
| --- | --- | --- | --- | --- | --- |
| H-(1) | 0.55 | 56,500 | 0.65 | 0.1 | colorless transparent |
| H-(2) | 0.43 | 47,900 | 0.58 | 0.1 | colorless transparent |
| H-(3) | 0.48 | 44,100 | 0.69 | 0.2 | colorless transparent |
| H-(4) | 0.40 | 37,300 | 0.67 | 0.3 | colorless transparent |
| H-(5) | 0.38 | 42,700 | 0.57 | 0.1 | colorless transparent |
| H-(6) | 0.73 | 52,300 | 0.91 | 0.1 | colorless transparent |
| H-(7) | 0.54 | 34,200 | 0.96 | 0.3 | colorless transparent |
| H-(8) | 0.41 | 53,100 | 0.51 | 5.2 | pale-yellow transparent |
| H-(9) | 0.44 | 61,200 | 0.49 | 3.8 | pale-yellow transparent |

As is clear from the Table 8, it can be understood that each of the polycarbonates obtained in H-(1) to (5) was not discolored and had a degree of branching suitable for the production of a hollow molding. Further, as understood from H-(6) and (7), the polycarbonates of H-(1) to (5) were substantially free from any branched structure that might be formed by a side reaction.

We claim:

1. A process for the preparation of a polycarbonate comprising a step of reacting a dihydric phenol with a carbonic acid diester in an amount of 0.90 to 1.50 mole per mole of the dihydric phenol in the presence of a transesterification catalyst comprising (a) a nitrogenous basic compound and (b) a compound in an amount of $10^{-8}$ to $10^{-2}$ mole per mole of the dihydric phenol containing an element selected from the group consisting of Group IIb, IVb and Vb elements of the periodic table in a melt transesterification process to prepare a polycarbonate having a branching parameter G of from 0.1 to 1.0 and terminal hydroxyl groups of 20 mole % or lower.

2. A process for the preparation of a polycarbonate comprising a step of reacting a dihydric phenol with a carbonic acid diester in an amount of 0.90 to 1.50 mole per mole of the dihydric phenol in the presence of a transesterification catalyst comprising (a) a nitrogenous basic compound and (b) a compound in an amount of $10^{-8}$ to $10^{-2}$ mole per mole of the dihydric phenol containing an element selected from the group consisting of Group IIb, IVb and Vb elements of the periodic table in a melt transesterification process to prepare a polycarbonate having a branching parameter G of 0.1 to 1.0 and a chlorine ion concentration of 10 ppm or lower.

3. A process for the preparation of a polycarbonate comprising a step of reacting a dihydric phenol with a carbonic acid diester in an amount of 0.90 to 1.50 mole per mole of the dihydric phenol in the presence of a transesterification catalyst comprising (a) a nitrogenous basic compound and (b) a compound in an amount of $10^{-8}$ to $10^{-2}$ mole per mole of the dihydric phenol containing an element selected from the group consisting of Group IIb, IVb and Vb elements of the periodic table in a melt transesterification process to prepare a polycarbonate having a branching parameter G of 0.1 to 1.0 and a total of an alkali metal ion concentration and an alkaline earth metal ion concentration of 1 ppm or lower.

* * * * *